May 23, 1967 R. D. KIRK 3,320,733
ROTARY LAWN MOWER BLADE MOUNTING STRUCTURE
Filed Sept. 9, 1965
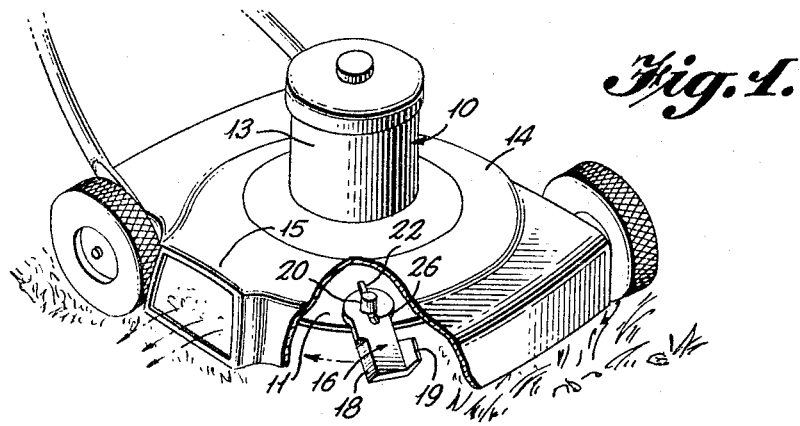
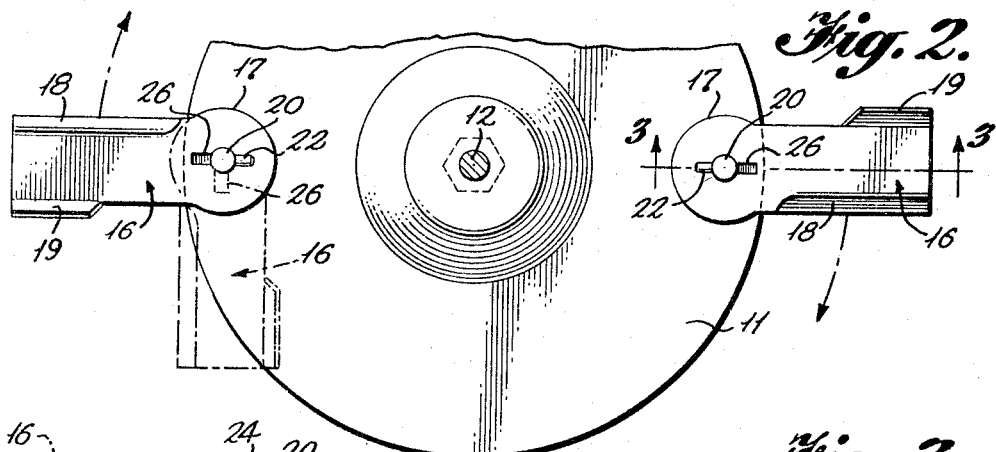
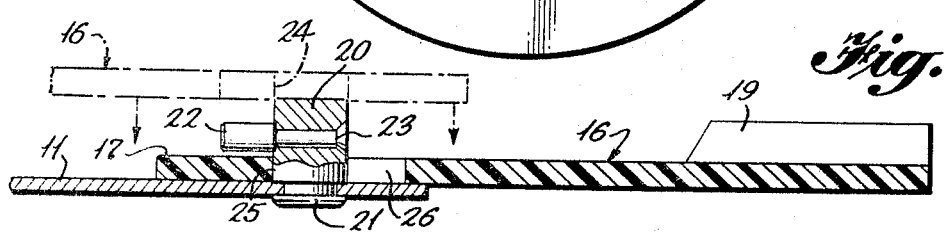
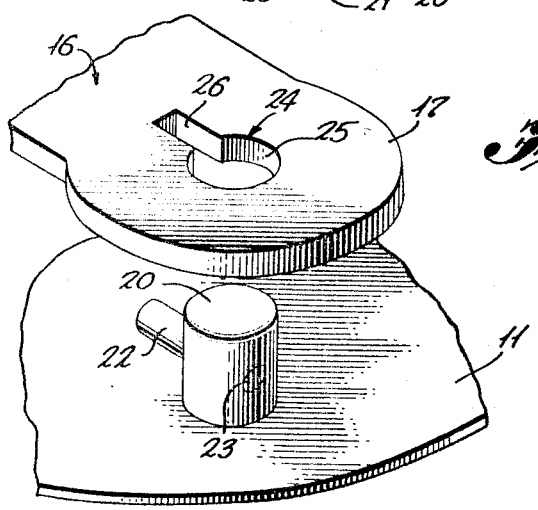
INVENTOR
Ralph D. Kirk
BY B. P. Fishburn, Jr.
ATTORNEY

United States Patent Office 3,320,733
Patented May 23, 1967

3,320,733
ROTARY LAWN MOWER BLADE MOUNTING STRUCTURE
Ralph D. Kirk, Rte. 4, Easley, S.C. 29640
Filed Sept. 9, 1965, Ser. No. 486,031
4 Claims. (Cl. 56—295)

This application is an improvement over my prior copending application Ser. No. 433,405, filed Feb. 17, 1965, for Cutting Blade Assembly for Rotary Lawn Mowers and the Like.

As set forth in the above application, the objective of the invention is to provide an improved, readily replaceable, non-metallic cutter blade for a rotary disc-type lawn mower.

For purposes of safety, the blade element is constructed from urethane plastic or the like and may have molded thereon an impeller part which tends to drive the cut grass out through the discharge chute of the mower housing or into a grass catcher more efficiently.

A main objective of the present improvement is to provide an improved economical connection between the readily replaceable plastic cutter blade and the carrier or mounting disc of the mower, allowing blades to be quickly removed or replaced whenever necessary without the use of tools.

A further object is to provide a blade mounting and connection which takes advantage of centrifugal force during lawn mower operation to hold the blade in a nonseparable position but allowing the blade to retract automatically upon contact with an obstruction and further allowing the blade to be manually swung to a disconnectable position when the lawn mower is idle.

Other objects and advantages of the invention will be apparent during the course of the following detailed description.

In the accompanying drawings, forming a part of this application and in which like numerals are employed to designate like parts throughout the same, FIGURE 1 is a perspective view of a lawn mower embodying the invention, partly broken away;

FIGURE 2 is an enlarged fragmentary plan view of the lawn mower carrier discs and blades, parts in section;

FIGURE 3 is an enlarged vertical section through one blade and associated parts, taken on line 3—3 of FIGURE 2; and FIGURE 4 is an exploded perspective view showing a connection between a cutter blade and the lawn mower carrier disc.

In the drawings, wherein for the purpose of illustration is shown a preferred embodiment of the invention, the numeral 10 designates a substantially conventional vertical axis type rotary lawn mower including a carrier disc 11 connected with and driven by a vertical drive shaft 12, in turn driven by a motor 13. The mower includes a housing 14 which encloses the disc 11 and cutter blades and has a side discharge chute 15 for grass cuttings. The chute may communicate with a suitable fabric bag or catcher for the grass cuttings.

A pair of diametrically opposed cutter blades 16 embodying the invention are bodily mounted upon the disc 11 by a sturdy connection, to be described, which allows each blade to be quickly disconnected from the disc when necessary and assures that the blade will not be accidentally disconnected during operation. Each blade 16 is preferably formed entirely from a tough somewhat flexible rubber-like material, such as urethane plastic or the like.

As shown in the drawings, the blades 16 are identical and each blade comprises a generally flat elongated body portion which is substantially thicker than the sheet metal disc 11. Each blade may be provided with a rounded head 17 at its inner end having the same thickness as the remainder of the blade. If desired, one longitudinal edge of each blade may be beveled as at 18 to enhance the cutting action but this beveling is not absolutely necessary as the speed of the mower is sufficient to produce cutting even with a non-beveled edge.

Additionally, each blade 16 may carry an integral short upturned impeller part 19 which serves to drive the grass cuttings out through the chute 15 during operation.

The connecting means between each blade 16 and the disc 11 comprises a short upstanding rather broad cylindrical metal stud 20 on the disc 11, spaced inwardly somewhat from the periphery of the disc and securely riveted to the disc as indicated at 21 in FIGURE 3. Carried by the stud 20 at an elevation above the disc 11 slightly exceeding the thickness of the adjacent blade 16 is a blade retainer pin 22 which is considerably smaller is diameter than the stud 20 and arranged at right angles to the stud and parallel to the disc 11 and projecting radially inwardly beyond the inner side of the stud. The retainer pin 22 is securely anchored to the upright stud 20 by riveting as shown at 23 or by other suitable means.

Each cutter blade 16 is provided centrally in its head 17 with a keyhole opening 24 including a circular portion 25 large enough to fit over the stud 20 and a radial slot extension 26 leading from one side of the portion 25 and of sufficient width to allow passage of the retainer pin 22 therethrough.

When it is desired to apply the blade 16 to the carrier disc 11, the blade is simply positioned relative to the disc so that the stud 20 may enter the circular opening 25 and the retainer pin 22 may enter and pass through the slot 26 of the keyhole opening. To accomplish this, the blade 16 must extend radially inwardly toward the center of the disc or 180 degrees from its normal operating position. FIGURE 3 in broken lines shows the position of the blade 16 enabling it to be mounted on the disc 11 and in full lines shows the normal operating position of the blades. When the stud 20 and pin 22 are aligned with the keyhole opening 24, the blade is simply shifted downwardly until it contacts the disc 11 and the blade is then turned 180 degrees so that it extends radially of the disc 11 and assumes its normal operating position shown in the drawings. In such position, the retaining pin 22 is out of alignment with the slot 26 and is immediately above a solid portion of the head 17 so as to positively lock the blade on the stud 20, whereby the blade cannot be displaced upwardly thereon.

An important feature of the invention resides in the fact that while the mower is in operation, centrifugal force holds each blade radially extended from the disc 11 with the slot 26 spaced 180 degrees from the retainer pin 22; in such position, the blade cannot possibly become detached from the stud 20.

Should the blade 16 strike a rock or some other solid object during operation, it can pivot back around the stud 20 freely to a position such as shown in broken lines at the left side of FIGURE 2. In such retracted position, the slot 26 is still out of registration or alignment with the pin 22 and the blade is firmly retained on the stud.

When it is desired to remove the blade for replacement, the blade 16 is simply pivoted on the stud 20 until the pin 22 is in alignment with the slot 26, whereupon the blade may be freely lifted from the stud 20 and disconnected from the disc. It is to be noted that no tools whatsoever are needed to manipulate the cutter blades. Furthermore, the connection is strong, economical to manufacture and entirely safe, as explained, and makes use of centrifugal force for rendering the simple connecion foolproof. It is believed that the advantages of the construction on a rotary type lawn mower will be apparent to those skilled in the art, without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A rotary lawn mower cutter blade assembly comprising a carrier disc which revolves in a substantially horizontal plane during operation of the lawn mower, diametrically opposed cutter blades mounted on said disc to travel therewith and maintained radially extended from said disc during rotation by centrifugal force, said blades having keyhole openings near their inner ends including reduced width slots which extend radially outwardly during rotation, studs on said disc engageable through said openings to form pivotal connections with said blades, and retaining pins on said studs spaced from said discs and receiving the blades between said disc and pins and extending substantially at right angles to the studs and projecting radially inwardly thereof and diametrically opposite to the reduced width slots while said blades are held radially extended by centrifugal force, said pins then positively retaining the blades on said studs, the blades being readily detachable from the studs by turning the blades around the studs until said slots of the keyhole openings become aligned with said pins.

2. The invention as defined by claim 1, and wherein each blade is formed from a tough plastic material.

3. The invention as defined by claim 2, and wherein said material is a urethane plastic.

4. The invention as defined by claim 3, and an upturned impeller part on each blade extending along one edge thereof serving to force grass cuttings through a discharge opening of the mower.

References Cited by the Examiner
UNITED STATES PATENTS

| | | | |
|---|---|---|---|
| 2,592,755 | 4/1952 | Soenksen | 56—295 |
| 2,898,725 | 8/1959 | Roesel | 56—295 X |

ANTONIO F. GUIDA, *Acting Primary Examiner.*

ABRAHAM G. STONE, *Examiner.*